United States Patent [19]
Taylor

[11] Patent Number: 4,776,977
[45] Date of Patent: Oct. 11, 1988

[54] PREPARATION OF EMULSIONS

[75] Inventor: Spencer E. Taylor, Camberley, England

[73] Assignees: The British Petroleum Company p.l.c., London, England; Intevep S.A., Caracas, Venezuela

[21] Appl. No.: 903,375

[22] Filed: Sep. 3, 1986

[30] Foreign Application Priority Data

Sep. 4, 1985 [GB] United Kingdom ................ 8521968

[51] Int. Cl.[4] ................ B01J 13/00
[52] U.S. Cl. ................ 252/314; 137/13; 252/312; 366/151; 366/348
[58] Field of Search ................ 252/312, 314; 137/13; 366/151

[56] References Cited

U.S. PATENT DOCUMENTS

| | | | |
|---|---|---|---|
| 3,419,494 | 12/1968 | Teeter et al. | 252/312 X |
| 3,425,429 | 2/1969 | Kane | 137/13 |
| 3,565,817 | 2/1971 | Lissant | 252/312 |
| 4,420,008 | 12/1983 | Shu | 137/13 X |

FOREIGN PATENT DOCUMENTS

| | | | |
|---|---|---|---|
| WO85/01352 | 3/1985 | PCT Int'l Appl. . | |
| WO85/03646 | 8/1985 | PCT Int'l Appl. | 252/312 |

OTHER PUBLICATIONS

W. Clayton: *The Theory of Emulsions and Their Technical Treatment*, Fourth Edition, The Blakiston Co., Philadelphia, 1943, pp. 462–463.

*Primary Examiner*—Richard D. Lovering
*Attorney, Agent, or Firm*—Morgan & Finnegan

[57] ABSTRACT

A continuous method for the preparation of an emulsion of oil in water of desired composition is disclosed which method comprises initially preparing an HIPR emulsion of oil in water by directly mixing 70 to 98% by volume of a viscous oil having a viscosity in the range 200 to 250,000 mPa.s at the mixing temperature with 30 to 2%, by volume of an aqueous solution of an emulsifying surfactant or an alkali, percentages being expressed as percentages by volume of the total mixture; mixing being effected under low shear conditions in the range 10 to 1,000 reciprocal seconds in such manner that an emulsion is formed comprising distorted oil droplets having mean droplet diameters in the range of 5 to 20 microns separated by aqueous films, measuring the conductivity of the HIPR emulsion, determining the quantity of aqueous liquids to be added as diluent an diluting the HIPR emulsion with the required quantity of diluent.

4 Claims, 1 Drawing Sheet

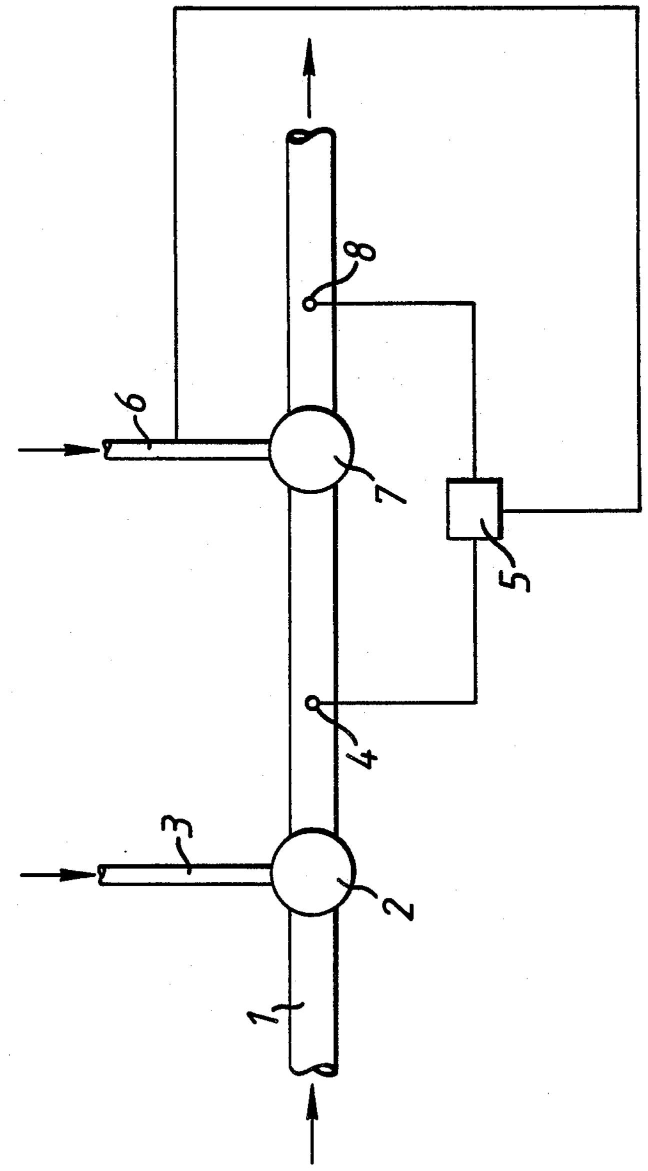
8
6
7
5
4
3
2
1

PREPARATION OF EMULSIONS

This invention relates to a method for the preparation of emulsions of oil in water.

Many crude oils are viscous when produced and are thus difficult, if not impossible, to transport by normal methods from their production location to a refinery.

Several methods have been suggested for the transportation of such crudes by pipeline. These include (1) heating the crude and insulating the pipeline, (2) adding a non-recoverable solvent, (3) adding a recoverable solvent, (4) adding a lighter crude oil, (5) forming an annulus of water around the crude and (6) emulsifying the crude in water.

Methods (1)-(4) can be expensive in terms of added components and capital expenditure and Method (5) is technically difficult to achieve.

Method (6) whilst superficially attractive presents special difficulties. The dispersion of a highly viscous oil in a medium of much lower viscosity is an unfavourable process on hydrodynamic grounds. This problem is further complicated by the economic requirement to transport emulsions containing relatively high oil phase volumes without sacrificing emulsion fluidity. Mechanical dispersing can lead to the formation of polydisperse or multiple emulsions, both of which are less suitable for transportation.

In the case of a system comprising dispersed spheres of equal size, the maximum internal phase volume occupied by a hexagonally close-packed arrangement is ca 74%. In practice, however, emulsions are rarely monodisperse and it is therefore possible to increase the packing density without causing appreciable droplet distortion. Attempts to increase further the internal phase volume results in greater droplet deformation and, because of the larger interfacial area created, instability arises; this culminates in either phase inversion or emulsion breaking. Under exceptional circumstances, it is possible to create dispersions containing as high as 98% disperse phase volume without inversion or breaking.

Emulsfied systems containing >70% internal phase are known as HIPR emulsions. HIPR oil-in-water emulsions are normally prepared by dispersing increased amounts of oil into the continuous phase until the internal phase volume exceeds 70%. Clearly, for very high internal phase volumes, the systems cannot contain discrete spherical oil droplets; rather, they will consist of highly distorted oil droplets, separated by thin interfacial aqueous films.

A useful state-of-the-art review of HIPR emulsion technology is given in Canadian Patent No. 1,132,908.

Our copending European patent application No. 85300998.3 discloses and claims a method for the preparation of an HIPR emulsion of oil in water which method comprises directly mixing 70 to 98%, preferably 80 to 90%, by volume of a viscous oil having a viscosity in the range 200 to 250,000 mPa.s at the mixing temperature with 30 to 2%, preferably 20 to 10%, by volume of an aqueous solution of an emulsifying surfactant or an alkali, percentages being expressed as percentages by volume of the total mixture; mixing being effected under low shear conditions in the range 10 to 1,000, preferably 50 to 250 reciprocal seconds in such manner that an emulsion is formed comprising highly distorted oil droplets having mean droplet diameters in the range 2 to 50 micron separated by thin interfacial films.

The HIPR emulsions as prepared are stable and can be diluted with aqueous surfactant solution, fresh water or saline water to produce emulsions of lower oil phase volume showing high degrees of monodispersity. The emulsions may be diluted to a required viscosity without adversely affecting stability. Because the narrow size distribution and droplet size are maintained upon dilution the resulting emulsion shows little tendency to creaming. This in turn reduces the risk of phase separation occurring.

The emulsions, particularly when diluted, are suitable for transportation through a pipeline and represent an elegant solution to the problem of transporting viscous oils.

The production of these, and other emulsions in a variety of industrial processes, often demands reliable and accurate knowledge of the relative contents of each phase. This is not a problem in the case of emulsions produced in a batchwise manner, since the composition of the resultant mixture is determined by the stoichiometry of the initial mixture.

However, in continuous production processes, monitoring of the emulsion composition is necessarily accomplished by indirect sampling methods. To achieve a direct continuous means of assessing emulsion composition, a method is required which will be solely dependent on the oil:water ratio and independent of the characteristics of the emulsion (e.g. droplet size distribution and nature of the stabilising surfactant).

We have now discovered that the emulsion conductivity ratio is a unique function of the oil phase volume and is independent of bulk phase salinity, surfactant and oil droplet size and thus the emulsion composition can be monitored using conductivity measurements. The emulsion conductivity ratio, K, is defined as the ratio of emulsion conductivity to the bulk aqueous phase conductivity.

Thus according to the present invention there is provided a continuous method for the preparation of an emulsion of oil in water of desired composition which method comprises initially preparing a HIPR emulsion of oil in water by directly mixing 70 to 98%, preferably 80 to 90%, by volume of a viscous oil having a viscosity in the range 200 to 250,000 mPa.s at the mixing temperature with 30 to 2%, preferably 20 to 10%, by volume of an aqueous solution of an emulsifying surfactant or an alkali, percentages being expressed as percentages by volume of the total mixture; mixing being effected under low shear conditions in the range 10 to 1,000, preferably 50 to 250, reciprocal seconds in such manner that an emulsion is formed comprising distorted oil droplets having mean droplet diameters in the range 2 to 50 micron separated by aqueous films, measuring the conductivity of the HIPR emulsion, determining the quantity of aqueous liquid to be added as diluent and diluting the HIPR emulsion with the required quantity of diluent.

Preferably the conductivity of the diluted emulsion is also measured and compared with the desired conductivity and, if necessary, the quantity of aqueous diluent is adjusted accordingly.

Conductivity meters are commercially available. A suitable model is that sold under the name Radiometer CDM 83 by Phillips.

Generally the API gravity of the crude oil should be in the range 5° to 20°, although the method can be applied to crude oils outside this API range.

Suitable oils for treatment are the viscous, heavy crude oils to be found in Canada, the USA and Venezuela, for example Lake Marguerite crude oil from Alberta, Hewitt crude oil from Oklahoma and Cerro Negro crude oil from the Orinoco oil belt.

Emulsifying surfactants may be non-ionic, ethoxylated ionic anionic or cationic, but are preferably non-ionic.

Suitable non-ionic surfactants are those whose molecules contain both hydrocarbyl, hydrophobic groups (which may be substituted) having a chain length in the range 8 to 18 carbon atoms, and one or more hydrophilic polyoxyethylene groups containing 9 to 100 ethylene oxide units in total, the hydrophilic group or groups containing 30 or more ethylene oxide units when the hydrophobic group has a chain length of 15 carbon atoms or greater.

Preferred non-ionic surfactants include ethoxylated alkyl phenols, ethoxylated secondary alcohols, ethoxylated amines and ethoxylated sorbitan esters.

Non-ionic surfactants are suitably employed in amount 0.5 to 5% by weight, expressed as a percentage by weight of the aqueous solution.

Insofar as non-ionic and ethoxylated ionic surfactants are concerned, the salinity of the aqueous phase is not material and fresh water, saline water (e.g. sea water) or highly saline water (e.g. petroleum reservoir connate water) may equally be employed.

Suitable cationic surfactants include quaternary ammonium compounds and n-alkyl diamines and triamines in acidic form.

They are suitably employed in amount 0.5 to 5% by weight, expressed as above.

Suitable anionic surfactants include alkyl, aryl and alkyl aryl sulphonates and phosphates.

They are suitably employed in amount 0.5 to 5% by wt, expressed as above.

When alkali is employed it is believed that this reacts with compounds present in the oil to produce surfactants in situ.

Alkali is suitably employed in amount 0.01 to 0.5% by weight, expressed as above.

The heavy oil and water may be mixed using equipment known to be suitable for mixing viscous fluids, see H. F. Irving and R. L. Saxton, Mixing Theory and Practice (Eds. V. W. Uhl and J. B. Gray), Vol 1, Chap 8, Academic Press, 1966. In addition to the equipment described above, static mixers may also be used.

For a given mixer, the droplet size can be controlled by varying any or all of the three main parameters: mixing intensity, mixing time and surfactant concentration. Increasing any or all of these will decrease the droplet size.

A particularly suitable mixer is a vessel having rotating arms. Suitably the speed of rotation is in the range 500 to 1,200 rpm. Below 500 rpm is relatively ineffective and/or excessive mixing times are required.

Suitable mixing times are in the range 5 seconds to 10 minutes. Similar remarks to those made above in respect of the speed range also apply to the time range.

The method is particularly suitable for emulsifying wet crude oils when the amount of water associated with the crude oil need not be accurately known.

The invention is illustrated with reference to the accompanying drawing.

Wet crude oil containing an unspecified quantity of water is supplied by line 1 to a low shear mixer 2 where it is emulsified with an aqueous solution of surfactant supplied by line 3 to form an HIPR emulsion.

The conductivity of this emulsion is measured by a conductivity meter 4 and hence the water content may be accurately determined, say 87% by volume. Signals from the conductivity meter 4 are fed to a flow controller 5 which adjusts the amount of diluent added through a line 6 to a second mixer 7 to form a diluted emulsion with a specified water content, say 50%.

The conductivity of the diluted emulsion is measured by a second conductivity meter 8 and compared with the conductivity corresponding to the desired concentration. Any discrepancy results in compensatory action by the flow controller 5.

I claim:

1. A continuous method for the preparation of an emulsion of oil in water of desired composition which method comprises initially preparing an HIPR emulsion of oil in water by directly mixing 70 to 98% by volume of a viscous oil having a viscosity in the range 200 to 250,000 mPa.s at the mixing temperature with 30 to 2%, by volume of an aqueous solution of an emulsifying surfactant or an alkali, percentages being expressed as percentages by volume of the total mixture; mixing being effected under low shear conditions in the range 10 to 1,000 reciprocal seconds in such manner that an emulsion is formed comprising distorted oil droplets having mean droplet diameters in the range 2 to 50 micron separated by aqueous films, measuring the conductivity of the HIPR emulsion, determining the quantity of aqueous liquid to be added as diluent and diluting the HIPR emulsion with the required quantity of diluent.

2. A method according to claim 1 wherein the initial emulsion is prepared by directly mixing 80 to 90% by volume of the viscous oil with 30 to 2% by volume of the aqueous solution of the emulsifying surfactant.

3. A method according to claim 1 wherein the viscous oil is a heavy crude oil having an API gravity in the range 5° to 20°.

4. A method according to claim 1 wherein the conductivity of the diluted emulsion is measured and compared with the desired conductivity and, if necessary, the quantity of aqueous diluent is adjusted accordingly.

* * * * *